United States Patent

[11] 3,594,070

[72] Inventor William A. Whitehead
 5 Osterley Park Road, Southall, England
[21] Appl. No. 778,216
[22] Filed Nov. 22, 1968
[45] Patented July 20, 1971
[32] Priority Nov. 30, 1967
[33] Great Britain
[31] 54605/67

[54] LIGHT AND/OR HEAT RECEPTIVE PANELS
 14 Claims, 4 Drawing Figs.
[52] U.S. Cl. .................................................. 350/260
[51] Int. Cl. ............................................... G02b 17/00
[50] Field of Search .......................................... 350/258,
 259, 260, 262, 264, 265

[56] References Cited
 UNITED STATES PATENTS
 755,196  3/1904  Wadsworth ................. 350/260
 1,943,995  1/1934  Weld ........................ 350/260
 2,768,556  10/1956  Boyd ........................ 350/260

Primary Examiner—Louis R. Prince
Assistant Examiner—Joseph W. Roskos
Attorney—Baldwin, Wight, & Brown ABSTRACT: A radiation receptive panel which has a first radiation receptive surface and a second radiation receptive surface which are so related to one another wherein radiation passing through the panel in one direction is much greater than the radiation which can pass in the opposite direction. This may be accomplished by providing the panel with a first radiation receptive surface and a second radiation receptive surface which is small in area in relation to the first surface, and the panel being constructed to focus radiation incident on the first surface towards a focal point adjacent the second surface.

Inventor:
William A. Whitehead
By Baldwin Wight Willer & Brown
Attorneys

LIGHT AND/OR HEAT RECEPTIVE PANELS

This invention relates to radiation receptive panels.

More particularly this invention relates to radiation receptive panels through which light and/or heat can pass in one direction, but provided with means to restrict their passage in the opposite direction.

Such panels are of particular but not exclusive use as windows in buildings.

According to the present invention there is provided a radiation receptive panel having a first radiation receptive surface and a second radiation receptive surface which is small in area in relation to said first surface, and including means to focus radiation incident on said first surface towards a focal point adjacent said second surface.

Each of the first and second surfaces can be either transparent or translucent.

The first surface can be one surface of a lens which directs radiation incident on the first surface onto the focusing means.

The focusing means is preferably a reflector, and is then preferably part-eliptical in cross section.

With a part-eliptical cross section reflector as the focusing means, preferably the first focus of the ellipse is at the center of the first surface lens and the second focus of the ellipse is at the focal point adjacent the second surface.

The first and second surfaces can be substantially the same overall area, the difference in radiation receptive area being obtained by a radiation reflecting means on the second surface which radiation reflecting means can be formed integrally with the focusing means.

Preferably the ratio between the areas of the first and second radiation receptive surfaces is between 5:1 and 10:1.

The first surface can be one surface of a first sheet of material and the second surface can be one surface sheet of material, the first and second sheets being secured together spaced apart and in mutually parallel planes.

Preferably the space between the first and second sheets is enclosed and evacuated.

A plurality of panels as described in any one of the preceding nine paragraphs can be arranged with their first surfaces all in one plane and their second surfaces all in another plane spaced from and parallel to said one plane, to form a composite radiation receptive panel.

With such a composite panel first surfaces can be formed integrally and the second surfaces can be formed integrally.

Further with such a composite panel including first and second sheets of material a valve can be provided by way of which the space between the first and second sheets can be evacuated.

Two embodiments, of panels, and modifications thereof, in accordance with the present invention will now be described by way of example, with reference to the drawings in which.

Figure 1:
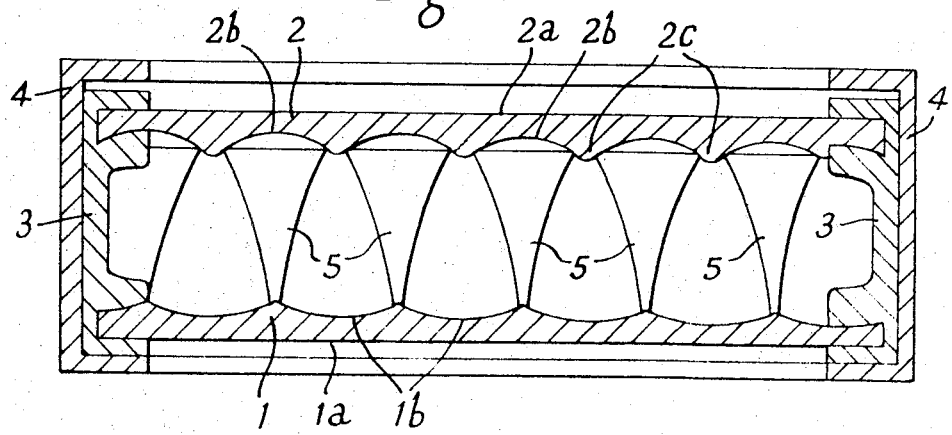
FIG. 1 is a horizontal cross section through a first embodiment.
Figure 2:
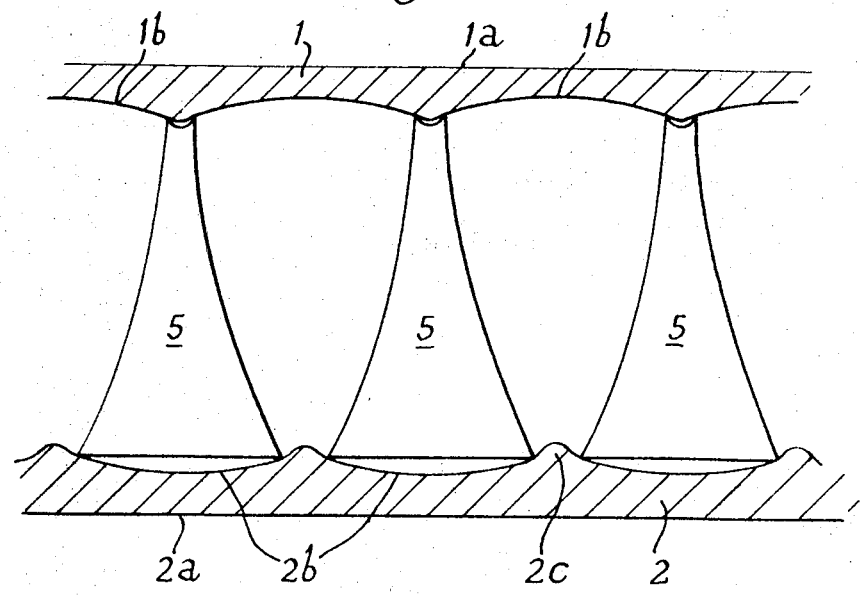
FIG. 2 shows part of FIG. 1 on an enlarged scale.

Referring to FIGS. 1 and 2, the panel comprises a first sheet of glass 1, having a flat outer surface 1a and an inner surface formed with a plurality of parallel concave flutes 1b and a second sheet of glass 2 having a flat outer surface 2a and an inner surface formed with a plurality of parallel concave flutes 2b separated by convex ribs 2c.

The sheets 1 and 2 are secured together, spaced apart and in parallel planes, by a rubber edge strip 3 which completely encloses and hermetically seals the space between the sheets 1 and 2, the ribs 2c on the sheet 2 being aligned with the centers of the flutes 1b on the sheet 1. Around the rubber strip 3 is a protective cover 4. A valve (not shown) is provided, which passes through the cover 4 and rubber strip 3, and by means of which the space between the sheets 1 and 2 can be evacuated.

Arranged between the sheets 1 and 2 is focusing means in the form of five elongated three-faced bodies 5 arranged with their apices at the junctions between the flutes 1b in the sheet 1 and their bases spanning the flutes 2b in the sheet 2. The bodies 5 are formed of a nonmetallic material and are provided with a light reflecting coating in the form of gold leaf, silvered paper, or a paint, on their three faces.

Alternatively a light reflecting metal can be used for the bodies 5, in which case heat insulating and antivibration means can be provided between the bodies 5 and the sheets 1 and 2 at their engagement positions.

It will be appreciated that although the sheets 1 and 2 have substantially the same overall area, the reflective bases of the bodies 5 prevent the passage of light and heat rays through a larger part of the area of the sheet 2, and thus the sheets 1 and 2 have mutually different radiation receptive areas.

Figure 3:
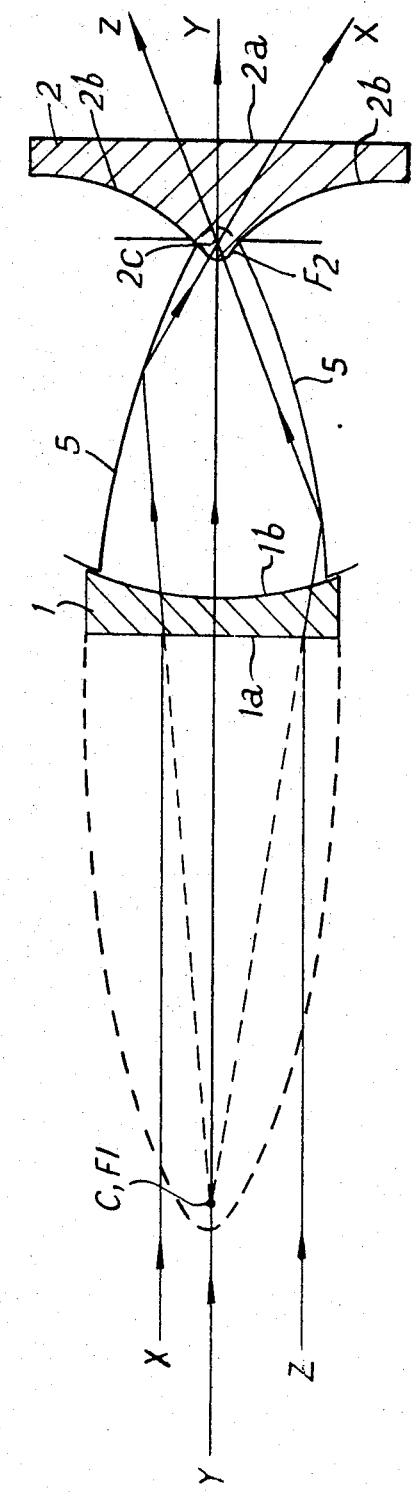
FIG. 3 is a diagram indicating the optics of panels in accordance with the present invention, and, FIG. 4 is a horizontal cross section through part of a second embodiment, showing the passage of a ray of light through the panel.

As can be seen from FIGS. 1 and 2, the two major faces of the bodies 5 are concave, and are in fact such that adjacent faces of adjacent bodies 5 together form a light focusing means in the form of a reflector which is part-eliptical in cross section, and the significance of this will now be described with reference to FIG. 3 in which the same reference numerals have been used as for parts shown in FIGS. 1 and 2.

As stated above, adjacent faces of adjacent bodies 5 together form a reflector which is part-eliptical in cross section. Further, the flutes 1b in the sheet 1 constitute concave lenses, and it is arranged so that the first focus F1 of the ellipse of each reflector is at the center C of one of the lenses 1b and the second focus F2 of the ellipse is at a point in or on a rib 2c on the sheet 2.

Thus, rays of light entering the panel through the surface 1a diverge on leaving the flutes 1b, and are then focused by the reflecting surfaces of the bodies 5 at the second focus F2 of the ellipse in or on the rib 2c, on the sheet 2, whereafter they diverge and leave the panel by the surface 2a. Three such rays of light X, Y, and Z are shown in FIG. 3.

Thus, light rays, and heat rays, can pass through the panel from the surface 1a to the surface 2a, losing intensity through efficiency loss, whereas the passage of such rays from the surface 2a to the surface 1a is considerably less, due to the different radiation receptive areas of the sheets 1 and 2. Under suitable conditions the temperature at the surface 2a can be much higher than that at the surface 1a, and this is enhanced by the provision of the vacuum between the sheets 1 and 2. Moreover, such a panel is a good sound insulator.

Figure 4:
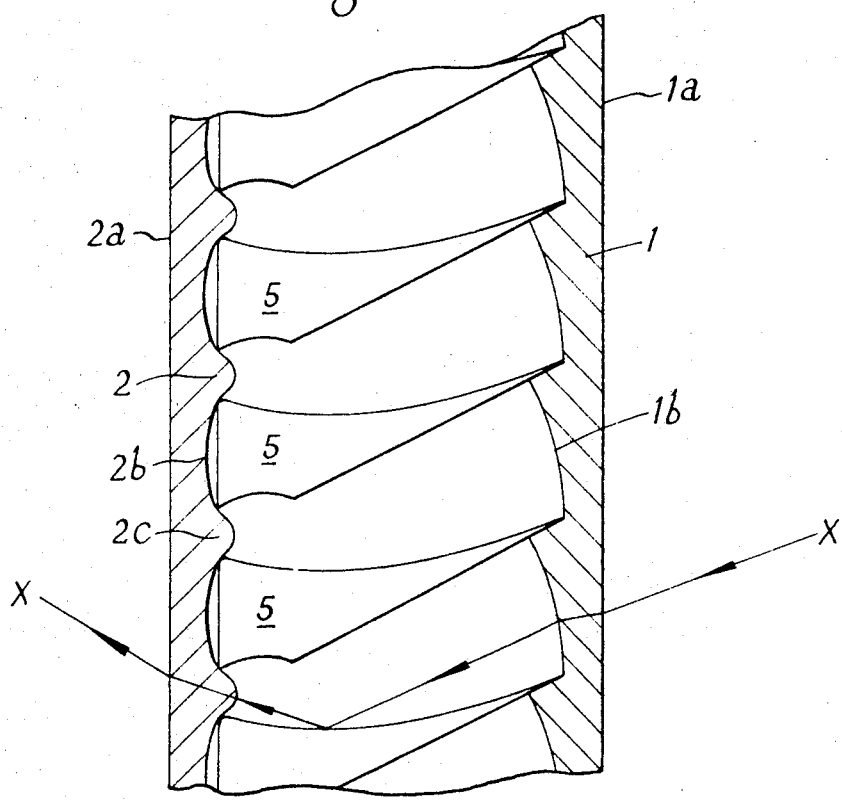

Referring now to FIG. 4, here parts corresponding to parts of the panel shown in FIGS. 1 and 2 have been given the same reference numerals.

In this panel the flutes 1b in the sheet 1 are only semiconcave, and the bodies 5 have four major faces. Such a panel is particularly suited to use in circumstances in which the incident radiation is mainly at an angle other than 90° to the surface 1a, as is the case when the panel is used as a vertical window. The passage of a ray of light X through the panel is shown in FIG. 4.

Although in the panels described above the sheets 1 and 2 are of glass, it will be appreciated that other materials, for example ductile glass, a plastics material, or a combination of glass and a plastics material, can be used instead.

When used as windows, panels as described above allow light to enter, but substantially prevent people from looking in, and also allow heat to enter while reducing heat loss from inside. Moreover, with evacuated panels a degree of sound proofing is provided.

Further, the panels can be used in pairs at right angles, with one or more pairs, to give a temperature difference between the two final outside surfaces, the temperature being changed from panel to panel in a geometric progression.

I claim:

1. A radiation receptive panel having a first radiation receptive surface and a second radiation receptive surface which is small in area in relation to said first surface, and including means to focus radiation incident on said first surface towards a focal point adjacent said second surface, said first surface being one surface of a first sheet of material and said second surface being one surface of a second sheet of material, said first and second sheets being secured together spaced apart and in mutually parallel planes, said first surface being in one plane and said second surface being in another plane spaced from and parallel to said one plane, said first and said second sheet each having a flat outer surface and an inner surface formed with a plurality of parallel concave flutes, the flutes on the inner surface of said second sheet being separated by convex ribs, said first and second sheets being arranged such that said ribs on said second sheet are aligned with the centers of said concave flutes on said first sheet.

2. A panel as claimed in claim 1 in which said focusing means are formed by a plurality of elongated three-faced bodies arranged with their apices at the junctions between said concave flutes in said first sheet and their bases spanning said concave flutes in said second sheet so as to form said reflecting means, the other faces of said bodies being such that adjacent faces of adjacent bodies together form a said focusing means.

3. A panel as claimed in claim 2 in which said bodies are formed of metal, heat insulating and antivibration means being provided between said bodies and said first and second sheets at their engagement positions.

4. A panel as claimed in claim 2 in which said bodies are formed of a nonmetallic material and are provided with a radiation reflecting coating on their three faces.

5. A panel as claimed in claim 1 in which said first and second sheets are of glass.

6. A panel as claimed in claim 1 in which said first and second sheets are of plastics material.

7. A radiation receptive panel through which radiation can pass in a first direction but provided with means to restrict the passage of radiation in a second and opposite direction, and having first radiation receptive surfaces on one side of the panel and second receptive surfaces of small size which are spaced apart from each other on the other side thereof, means for preventing the passage of radiation in said second direction between said second reception surfaces and focusing means between said surfaces to focus radiation incident on said first surfaces towards focal points adjacent said second surfaces.

8. A panel as claimed in claim 7 in which each of said first surfaces is one surface of a lens which directs radiation incident on said first surface onto said focusing means.

9. A panel as claimed in claim 8 in which said focusing means comprises a reflector.

10. A panel as claimed in claim 7 in which each of said second surfaces is one surface of a lens.

11. A panel as claimed in claim 10 in which said first surfaces are provided on one surface of a first sheet of material and said second surfaces are provided on one surface of a second sheet of material, said first and second sheets being secured together spaced apart and in mutually parallel planes and said first sheet having a flat outer surface and an inner surface formed with a plurality of parallel concave flutes and said second sheet having a plurality of parallel convex ribs, and said first and second sheets being arranged such that said convex ribs on said second sheet are aligned with the centers of said concave flutes on said first sheet.

12. A panel as claimed in claim 11 in which said focusing means are formed by a plurality of elongated bodies of triangular cross section, arranged with their apices at the junctions between said concave flutes in said first sheet and their bases extending between said convex ribs on said second sheet so as to form means for preventing the passage of radiation in said second direction between said second surfaces, the other faces of said bodies being such that adjacent faces of adjacent bodies together form a said focusing means.

13. A panel as claimed in claim 7 in which said means for preventing the passage of radiation in said second direction between said second surfaces are provided by reflecting means which reflect incident radiation into said first direction.

14. A panel as claimed in claim 13 in which said reflecting means are formed integrally with said focusing means.